No. 791,118. PATENTED MAY 30, 1905.
L. WADE.
GAME CARDS.
APPLICATION FILED MAR. 5, 1904.

WITNESSES:
E. E. Cady
M. R. Henman

INVENTOR.
Leigh Wade
BY M. M. Cady
ATTORNEY.

No. 791,118. Patented May 30, 1905.

UNITED STATES PATENT OFFICE.

LEIGH WADE, OF WEST UNION, IOWA.

GAME-CARDS.

SPECIFICATION forming part of Letters Patent No. 791,118, dated May 30, 1905.

Application filed March 5, 1904. Serial No. 196,780.

*To all whom it may concern:*

Be it known that I, LEIGH WADE, a citizen of the United States, residing at West Union, in the county of Fayette and State of Iowa, have invented new and useful Improvements in Game-Cards, of which the following is a specification.

My invention relates to games, with special reference to games for educational purposes in the department of geography, and has for its objects to provide a game which shall not only be entertaining and amusing, but shall teach the players the boundaries of the different political divisions of countries and indirectly various data relative to these divisions.

My improved game consists of a deck or pack of playing-cards which includes a set of leading cards each of which represents a geographical division of a country, with data pertaining to such geographical division contained thereon; a set of switch-cards, some of which represent a boundary of the country and some of which represent a river of the country, with data pertaining to such boundary or river contained thereon, and a high-privilege card representing the capital of said country, with data pertaining to the capital contained thereon. The set of switch-cards that represent the boundaries of the country also represent a boundary of some of the geographical divisions of the leading cards, and the set of switch-cards that represent the rivers of the country also represent a boundary of some of the geographical divisions of the leading cards, so that the several sets of cards become correlative and interdependent when the game is played.

For a better understanding of my invention and the manner in which the cards are played attention is called to the following specification, together with the drawings accompanying the same and forming a part hereof.

Figure 1:
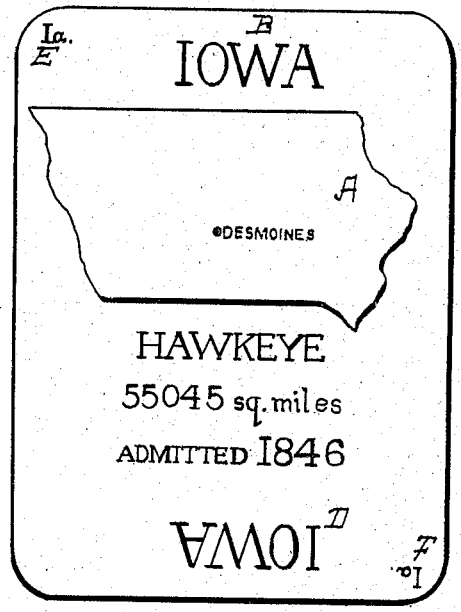
Figure 2:
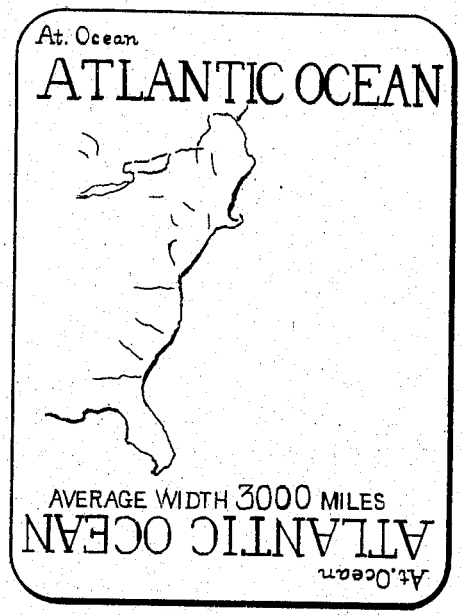
Figure 3:
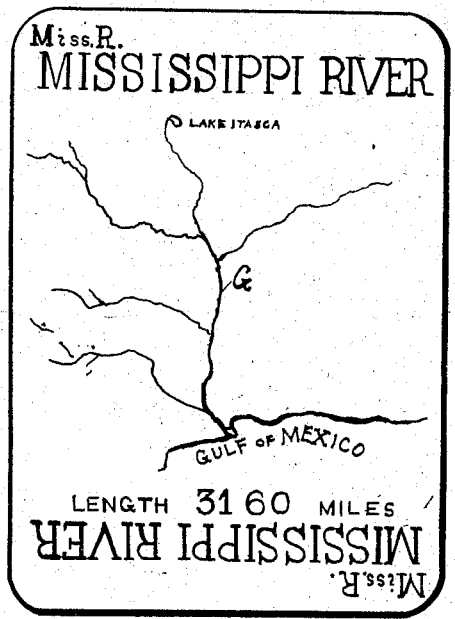
Figure 4:
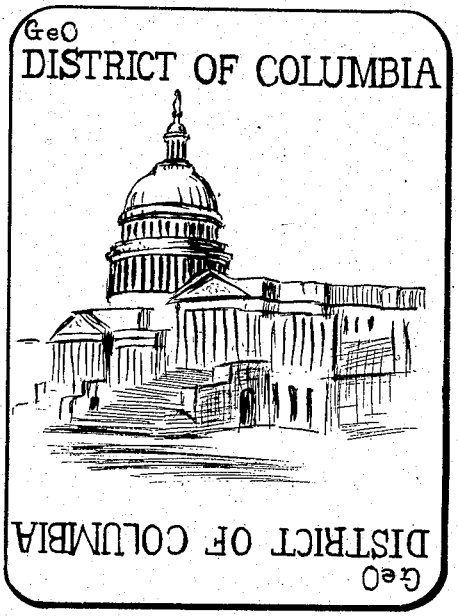

Figure 1 is a plan view of one side of a card representing the State of Iowa and called "leader." Fig. 2 is a face view of one of the boundary-cards, representing in this case the Atlantic Ocean and called a "switch-card." Fig. 3 is a face view of one of the cards, representing a leading river and in this case the Mississippi river and called "switch-card." Fig. 4 is a face view of the high-privilege card, representing the District of Columbia and called "G e O."

Like letters of reference denote corresponding parts in each of the figures.

In the present description it seems only necessary to describe one card with one State thereon, one boundary, one leading river, and the high-privilege card or "G e O," and therefore I have shown the State of Iowa, the Atlantic Ocean, the Mississippi river, and the District of Columbia.

Referring to the drawings, A designates the map of the State of Iowa. At the top and bottom of the card at B and D are printed the words "Iowa," and in the left-hand corners E and F are printed the abbreviations of the State, "Ia." There is preferably placed upon this side of the card on the map of the State the name and position of its capital and on the card statements of the leading events and characteristics of the State. In this I give the name of the State "Hawkeye," the area in square miles "55,045," and the date when it was admitted to the Union, "1846." The other cards representing the different States may each have on one side beside the map any events or statements of any facts connected with the State. These statements of fact or data relative to the State or geographical division may be changed within the scope of the appended claims and without departing from the principle of the invention—as, for instance, leading characteristics for which the State is noted may be placed thereon and leading events and happenings.

The back of the card may be ornamented in any attractive design, but should be the same on all, so that no one of the players would know any card by a difference in the design on the back With these cards representing the different States, which I designate as "leading cards," are eight other cards called "switch-cards" and one card called the "high-privilege" card, "G e O."

The switch-cards are composed of eight cards, five of which represent the boundaries of the United States and named "Atlantic Ocean," "Gulf of Mexico," "Mexico," "Pacific Ocean," and "Canada." One of these switch-cards, "Atlantic Ocean," is shown in Fig. 2 and has thereon "Atlantic Ocean" printed at opposite ends of the card with abbreviation "At. Ocean" in the left-hand corners. Between these names "Atlantic Ocean" may be a representation of a shore and below statements therein of some fact connected with the ocean. The other boundary-cards are the same as the one shown in Fig. 2, with the exception of the different names, different representations, and statements of facts thereon. For the other three switch-cards I have selected the leading rivers, the Mississippi river, Missouri, and Ohio, and have shown in Fig. 3 the Mississippi river. On this card is printed at the top and bottom the words "Mississippi river," also in diagonal corners the abbreviation "Miss. R.," and along in the center of the card a line G, representing the river, which terminates at one end in Lake Itaska and at the other in the Gulf of Mexico, together with a statement thereon of the length of the river, "3,160 miles." There may be added other statements relative to the river. Upon the other two cards, representing the Missouri and Ohio rivers, the arrangement of the printing thereon is similar in all respects.

The leading privilege-card, which I have named "G e O," is represented in Fig. 4. In the center of the card is preferably a picture of the capitol building of the United States, and above and below are printed the words "District of Columbia," and in diagonal corners the arbitrary word "G e O." On this card may be printed any facts relating to the city of Washington.

It will be seen from the foregoing description that each card must have thereon some identification, and, as it will subsequently appear, much interest will be added to the game and geographical knowledge will be imparted to the players if some facts relative to the representation on the cards are also printed thereon.

The manner in which I play this game is substantially as follows: The cards are thoroughly shuffled and dealt in the usual manner, giving, preferably, five cards to each player, the remaining cards being left upon the table face downward. The player to the left of the dealer then plays one card—say the "State of Iowa"—then the player next to the left plays some card which in some manner bounds Iowa, provided he has one, and if he has none in his hand he may play a switch-card or "G e O," if he chooses, or he must draw a card from the pack, and if this does not border on Iowa the play passes to the next player to the left, who must also play some card, as before described. If he has a card, say, "Missouri," he plays it upon the card "Iowa," and then the game is transferred to some boundary of Missouri, and if he has another card in his possession that bounds Missouri in any manner he can play it thereon, and so on. For instance, he has "Kansas." He plays it upon the card "Missouri," and the game is then transferred to some boundary of Kansas. In this manner the playing continues until all of the cards have been drawn. When all of the cards have been drawn, then each player as his turn comes must play a card of some kind. If he has no leader-card which borders upon the card last played, then he must play one of the switch-cards, if he has one. This transfers the game to some State which borders upon this switch-card. For instance, the last card played was "Colorado" and the next player plays a switch, for instance, "Canada." Then he can play any card that borders upon Canada, such as Washington, Idaho, Montana, Maine, &c. Then if the next player cannot play anything which borders on the last card played he must play one of his switch-cards, if he has it, and suppose he has the "Atlantic Ocean," he can play that, and then the game is transferred to any State bordering upon the Atlantic, and he can place thereon any of his cards which borders that ocean. The same may be said with relation to the three leading rivers, also called "switch-cards."

It will be seen that the game cannot be blocked as long as some player holds a switch-card or a high-privilege card, as these cards when played change the course of the game and enable some one or more of the players to follow with a leading card the geographical division of which borders on the geographical division of the card last played, which may be a switch-card. It will further be seen that these switch-cards and the high-privilege card are advantageous to a player, since after playing the switch-card he may follow with a number of leading cards and quickly exhaust his hand. Since the switch-cards represent the boundaries of the country and three rivers thereof, which are so located as to border on those geographical divisions or States which do not border on the boundaries of the country, it is evident that it is seldom that the game is blocked, because of the great number of leading cards that might be played after a switch-card has been played, inasmuch as the switch-cards not only represent the boundaries of the country, but also a boundary of some of the geographical divisions of the leading cards, and the same is true of the switch-cards representing the rivers.

As to the high-privilege card, the District of Columbia, called "G e O," if the holder of this card plays it then he can put down any card he has without reference to its bordering upon anything and play as many cards as border upon the card he plays. For instance, he plays "G e O," and then he may play "Colorado," "New Mexico," "Texas," "Louisiana," "Mississippi," &c.

If a player has reduced his hand to one card, he or any of the players may call "G e O," and then all of the players at the table may ask him at least one question relative to the matters and things stated upon any of the cards, and if he correctly answers all of these questions then he has won the game. If, however, he cannot answer them, then each one of the players delivers to him a card and he continues in the game. In this manner the game continues until some one player has no more cards and wins the game or till the game is blocked and no player has a switch-card or "G e O" or any leading card which is a boundary of the last card played.

It will be seen by this game and the manner of playing it that it will require a thorough knowledge of the boundary of each State and also a large amount of information concerning each State. If any party plays a card which does not bound the card last played, then there may be a penalty by way of withdrawing the card and drawing another card from the pack or the players giving to that one who has made the mistake a card.

I have shown only one mode in which this game may be used; but it is manifest that it may be used in various ways and different penalties attached for incorrect playing and for lack of knowledge of the boundaries of the different States.

It will be seen that this game affords a wide range in learning, and especially in geographical learning, as it can be adapted for any foreign country with its political division and also for a single State with its political divisions of counties and cities and the like and still be within the spirit of my invention.

Having now described my invention, what I claim is—

1. A deck of playing-cards consisting of a set of leading cards each of which represents a geographical division of a country with data pertaining to such geographical division contained thereon, a set of switch-cards, some of which represent a boundary of the country, and some of which represent a river of the country with data pertaining to such boundary or river contained thereon, and a high-privilege card representing the capital of said country with data pertaining to the capital contained thereon, substantially as set forth.

2. A deck of playing-cards consisting of a set of leading cards each of which represents a geographical division of a country, and a set of switch-cards, some of which represent a boundary of the country, and some of which represent a river of the country and also a boundary of some of the geographical divisions of the leading cards and having thereon information pertaining to such boundary or river.

3. A deck of playing-cards consisting of a set of leading cards each of which represents a geographical division of a country, a set of switch-cards, some of which represent a boundary of the country and also a boundary of some of the geographical divisions of the leading cards, and some of which represent a river of the country and also a boundary of some of the geographical divisions of the leading cards.

In testimony whereof I have signed my name to this specification in the presence of two subscribing witnesses.

LEIGH WADE.

Witnesses:
W. M. PEEK,
J. L. SCALLAN.